United States Patent [19]

Warwick et al.

[11] Patent Number: 4,531,276

[45] Date of Patent: Jul. 30, 1985

[54] METHOD OF MAKING A DRUM BRAKE SHOE AND LINING ASSEMBLY

[75] Inventors: Edward H. Warwick, Englewood; Donald L. Parker, Middletown, both of Ohio

[73] Assignee: General Motors Corporation, Detroit, Mich.

[21] Appl. No.: 565,470

[22] Filed: Dec. 27, 1983

Related U.S. Application Data

[62] Division of Ser. No. 385,494, Jun. 7, 1982, Pat. No. 4,453,621.

[51] Int. Cl.³ .............................................. B23P 17/00
[52] U.S. Cl. ........................................ 29/417; 29/445; 29/458; 29/530
[58] Field of Search .............. 29/412, 417, 458, 527.1, 29/530, 445; 188/250 G, 215, 250 B, 256

[56] References Cited

U.S. PATENT DOCUMENTS

| | | | |
|---|---|---|---|
| 707,232 | 8/1902 | House, Jr. | 188/250 G |
| 1,320,669 | 11/1919 | Auger | 188/250 G X |
| 1,673,027 | 6/1928 | Thompson | 188/250 G X |
| 2,727,845 | 12/1955 | Bishop | 188/250 G X |
| 3,467,229 | 9/1969 | Deibel | 188/250 G X |
| 3,470,598 | 10/1969 | Berthelsen | 29/417 X |
| 4,030,185 | 6/1977 | Hahm et al. | 29/412 X |
| 4,333,221 | 6/1982 | Hayashi | 29/417 X |
| 4,360,959 | 11/1982 | Johannesen | 29/417 X |

FOREIGN PATENT DOCUMENTS

| | | | |
|---|---|---|---|
| 566186 | 8/1957 | Italy | 188/250 G |
| 86930 | 7/1980 | Japan | 188/250 G |

Primary Examiner—Charlie T. Moon
Attorney, Agent, or Firm—D. D. McGraw

[57] ABSTRACT

A strip of shoe rim steel has holes punched, and lining is molded to it in segments with flat or curved tops, the strip then being bent at locations between the lining segments and remaining flat so as not to destroy the bond. The assembly is trimmed to length, the web attached and the lining pads ground to final dimensions. The number and length of lining pad segments can be varied. The lining can be used down to the rim ends at each pad while the pad center still contains lining where the molding holes are located.

3 Claims, 2 Drawing Figures

METHOD OF MAKING A DRUM BRAKE SHOE AND LINING ASSEMBLY

This is a division of U.S. patent application Ser. No. 385,494, filed June 7, 1982, now U.S. Pat. No. 4,453,621.

The present invention relates to a method of making a drum brake shoe and lining assembly in which the shoe rim has a series of flat surfaces on which brake lining segments are secured. The method is particularly adapted for automatic manufacture. A strip of shoe rim steel passes through a punch and die so that lining material retention holes are punched therein. The strip passes through a lining material molding device which molds lining segments in separated relation on the steel strip with the lining material being integrally molded through the punch holes to retain the lining segments on the rim steel strip. The strip with the molded lining segments then passes through a curing device such as an oven so that the lining segments are cured. The strip next passes through a trimmer and a shaper. The shaper bends the rim steel along transverse lines located between adjacent lining segments, as well as at the outer edges of the end lining segments, so that the shoe rim is generally arcuately formed with a series of flat surfaces which are chordally positioned within the rim arc. The trimmer is then actuated to cut the strip approximately to provide individual shoe rims with lining. Shoe webs having outside edge surfaces formed complementary to the inner surfaces of the rims are provided and suitably attached to the rims. The lining segments are then ground so that their outer surfaces are curved along an arc adapted for engagement with the inner friction braking surfaces of brake drums. The trimmer may be operated to trim the lining segments either before, during or after the forming of the rim to provide chords of arcs. The number and length of the lining segments may be varied to obtain the optimum amount of usable lining desired. Since there are no rivets, lining segments can be used until worn to the bent joint areas adjacent to the lining segments. The center of each lining segment will still contain lining, and the molding holes punched in the rim through which lining material is molded are preferably located here for better attachment strength.

The method embodying the invention is particularly adapted to a high speed continuous operation which is highly automated. The usual separate operations of making and handling shoe rims, making and handling webs, securing the rims and webs together, and drilling and riveting lining segments to the rims have been combined into a continuous operation performing the several necessary steps. The method of making the finished brake shoe assembly is particularly adapted for use with metallic lining materials because the problems of bending a brittle material are eliminated by molding the material on flat surfaces which remain flat.

IN THE DRAWING

Figures 1, 2:
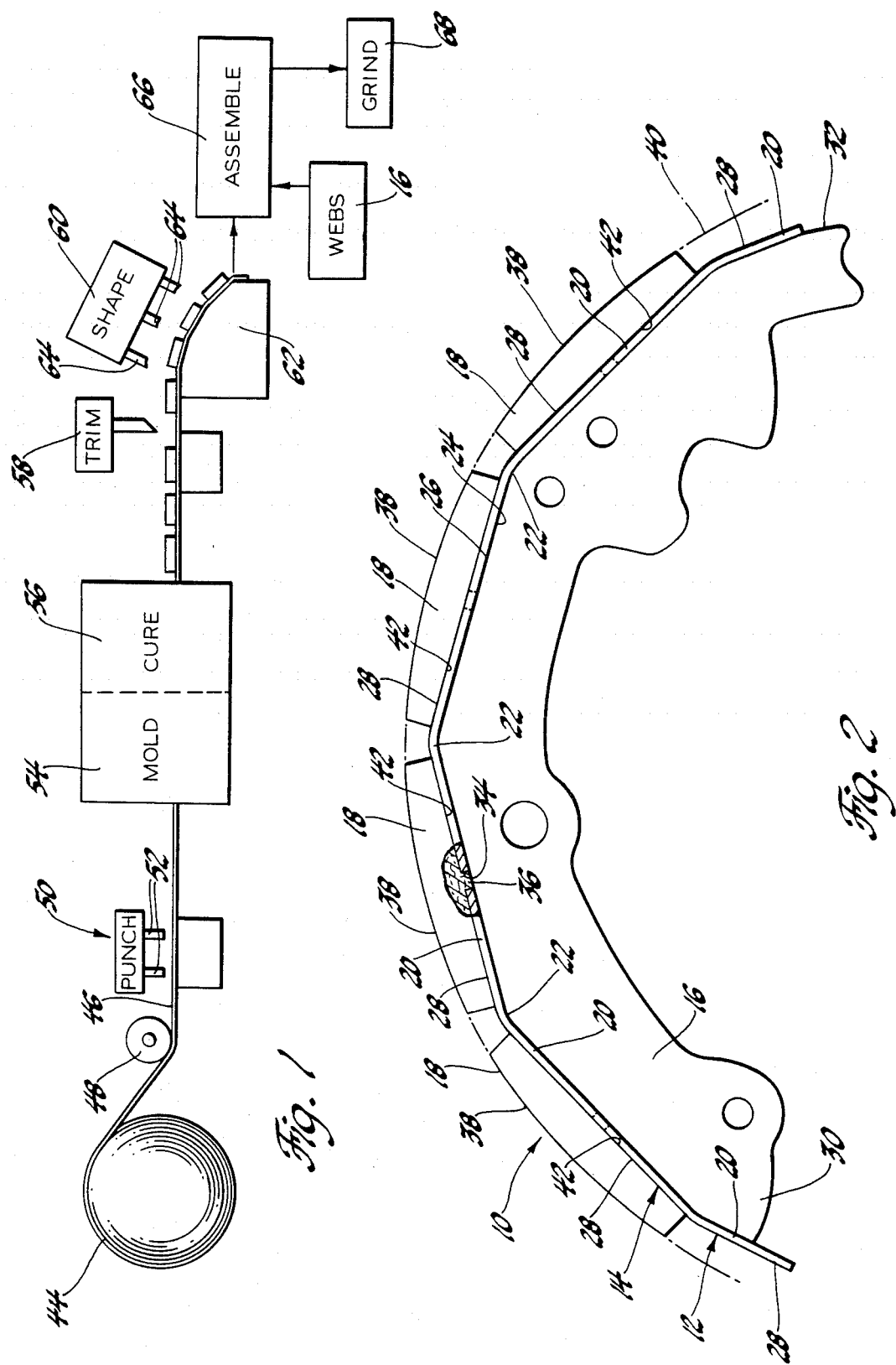
FIG. 1 is a schematic representation of an operation using the claimed process of making the brake shoe assemblies.
FIG. 2 is an elevation view of a brake shoe assembly, having parts broken away and in section, and made by the claimed method embodying the invention.

The shoe and lining assembly 10 illustrated in FIG. 2 includes a brake shoe 12 formed by a shoe rim 14 and a shoe web 16. The outer side of the shoe rim 14 has several lining segments 18 secured thereto.

Shoe rim 14 is generally arcuately formed so as to accommodate the assembly within a brake drum. The shoe rim is formed with a series of planar rim sections 20 joined at 22 by bends in the rim about bending lines extending transversely of the rim. The planar rim sections 20 and bent joints 22 cooperate to form a chordally defined shoe rim arc. The inner surface 24 of the rim is shaped as a series of chordally joined segments of the shoe arc and the outer edge surface 26 of web 16 is formed in a complementary manner so that the web fits neatly within the rim and is secured thereto by suitable means such as welding. The flat surfaces 28 formed by the planar rim sections 20 define the outer surface of the shoe rim 14.

The flat surfaces 28 of each of the planar rim sections 20 except for the two end flat surfaces 28 which form parts of the ends 30 and 32 of the assembly 10, have lining segments 18 secured thereto. One or more holes 34 are formed through these planar rim sections in positions substantially equidistant between the adjacent joints 22. In the preferred embodiment two such holes 34 are provided so that one is located on either side of the center portion of rim 14 engaged by web 16. The lining segments 18 are molded in place on the rim 14 so that lining material extends through the holes 34 as shown at 36. This provides suitable attachment of the lining segments 18 to the rim 14 so that no rivets or adhesive bonding is required. In some instances, it may be desirable to provide an adhesive bond as an additional securing means. The adhesive may be placed on the rim flat surfaces 28 before the lining material is molded thereon, and cured while the lining material is being cured.

As originally molded, the lining segments 18 may be substantially rectangular as seen in elevation in a view similar to that of FIG. 2, or may be preshaped with outer curved surfaces approximating the final curved surfaces 38 achieved after the lining segments are ground to precise dimensions along arc 40. The lining segments inner surfaces 42 are also flat and in surface engagement with the outer flat surfaces of planar rim sections 28. The lining segments 18, once molded in place, are flat and remain flat thereafter. This is particularly advantageous when metallic or semimetallic lining material is used, since such materials are more brittle than lining materials of an organic nature and cannot be subjected to any substantial bending or forming stresses.

The assembly 10 is preferably made by the process illustrated in FIG. 1. In this process, a roll 44 of rim steel, previously cut to the desired width, is suitably mounted so that the strip 46 of rim steel forming the roll may be led through the various steps of the entire operation. As illustrated, strip 46 is led past a guide roll 48 and through a die 50. Die 50 has a punch and die arrangement in which punches 52 and punch holes 34 in the strip 46 at appropriate locations along the strip. The punched strip then passes through a molder and curing stage. In the molder 54, brake lining material is molded in segments on the rim steel strip 46 so that the holes 34 are located substantially equidistant between the ends of each lining segment and lining material 36 fills the holes 34. The strip then passes into the curing section 56 and the lining segments 18 are cured in place. The strip then passes through a trimmer 58 and a shaper 60. The shaper 60 is illustrated as having a die 62, formed to define the inner surface of the shoe rim 14, and forming units 64 which engage the upper surface of strip 46 and cause the strip to be bent to form joints 22 and planar rim sections 20. When the shaper 60 has shaped a rim, the trimmer 58 may be operated to trim the rim to its appropriate length. The rim, with the lining segments secured thereto, is then passed to an assembly station 66 where a web 16 is positioned against the rim and secured thereto. The unit 10 is at this point fully assembled. It then passes to a grinding station 68 where the curved surfaces 38 of the lining segments 18 are grounded to fit the desired arc 40. This method of making assemblies 10 is particularly adapted to automatic operation, which may be continuous and run at a high speed. Separate operations for making and assembling the parts of the assemblies 10 are combined into a continuous operation defined by various stations.

The number and length of each of the lining segments 18 can be varied to obtain the optimum amount of usable lining desired. Since there are no rivets, the lining can be used until the arc 40 approaches the rim at the outer sides of joints 22. This allows a more efficient use of lining material. The center of each lining segment 18 will still contain some lining material at and outward of holes 34 so that the segments remain attached to the rim 14. By providing the attachment holes at the center of each lining segment, greater attachment strength is also assured.

The embodiments of the invention in which an exclusive property or privilege is claimed are defined as follows:

1. The method of making a drum brake shoe aand lining assembly comprising the steps of:
    (a) passing a flat strip of brake shoe rim steel through a die and punching holes therein for attaching the lining and the shoe web;
    (b) molding a series of lining segments onto said brake shoe rim steel including molding lining segments into holes punched therein, forming a rim steel strip and lining assembly;
    (c) curing the series of lining segments;
    (d) bending the strip of brake shoe rim steel at each crosswise location between the lining segments to form a chordally defined shoe arc with the brake shoe rim steel remaining flat under each lining segment;
    (e) trimming the rim steel and lining assembly to length as necessary;
    (f) securing a preformed shoe web to the rim steel portion of the rim steel and lining assembly to form a drum brake shoe and lining assembly;
    (g) and grinding the lining segments to final dimensions with the friction braking surfaces thereof forming segments of a curved arc.

2. The method of making a drum brake shoe and lining assembly comprising the steps of:
    (a) passing a flat strip of brake shoe rim steel through a die and punching holes therein for attaching the lining and the shoe web;
    (b) molding a series of lining segments onto said brake shoe rim steel including molding lining segments into holes punched therein, forming a rim steel strip and lining assembly;
    (c) curing the series of lining segments;
    (d) bending the strip of brake shoe rim steel at each crosswise location between the lining segments to form a chordally defined shoe arc with the brake shoe rim steel remaining flat under each lining segment;
    (e) trimming the rim steel strip into proper shoe rim length to form one continuous shoe rim assembly at some point in the method before step (g) is performed;
    (f) forming a shoe web with the outer edge surface thereof defined by angularly adjacent chordal segments shaped to mate with the rim steel form of one continuous shoe rim assembly existing after step (d) has been performed on the rim steel strip;
    (g) securing a preformed shoe web to the rim steel portion of the rim steel and lining assembly to form a drum brake shoe and lining assembly;
    (h) and grinding the lining segments to final dimensions with the friction braking surfaces thereof forming segments of a curved arc.

3. The method of making a drum brake shoe and lining assembly comprising the steps of:
    (a) passing a flat strip of brake shoe rim steel through a die and punching holes therein for attaching the lining and the shoe web;
    (b) molding a series of lining segments onto said brake shoe rim steel including molding lining segments into certain of the holes punched therein, forming a rim steel strip and lining assembly with the lining segments retained on the rim steel strip by the lining segments being molded into the certain holes;
    (c) curing the series of lining segments;
    (d) bending the strip of brake shoe rim steel at each crosswise location between the lining segments to form a chordally defined shoe arc with the brake shoe rim steel remaining flat under each lining segment;
    (e) trimming the rim steel and lining assembly to length as necessary after performing step (b) and before performing step (f);
    (f) securing a performed shoe web to the rim steel portion of the rim steel and lining assembly to form a drum brake shoe and lining assembly;
    (g) and grinding the lining segments to final dimensions with the friction braking surfaces thereof forming segments of a curved arc.

* * * * *